United States Patent
Smuk et al.

(10) Patent No.: US 6,744,985 B1
(45) Date of Patent: Jun. 1, 2004

(54) DATA BUS FOR A PLURALITY OF NODES

(75) Inventors: Karel Smuk, Schweitenkirchen (DE); Robert Griessbach, Wayarn (DE); Martin Peller, Munich (DE); Josef Berwanger, Poing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/623,898
(22) PCT Filed: Feb. 23, 1999
(86) PCT No.: PCT/EP99/01162
§ 371 (c)(1), (2), (4) Date: Nov. 16, 2000
(87) PCT Pub. No.: WO99/46891
PCT Pub. Date: Sep. 16, 1999

(30) Foreign Application Priority Data

Mar. 10, 1998 (DE) .......................... 198 10 290

(51) Int. Cl.[7] .............................................. H04B 10/20
(52) U.S. Cl. .............................. 398/60; 398/61; 398/63
(58) Field of Search ............................. 398/60, 61, 63, 398/73

(56) References Cited

U.S. PATENT DOCUMENTS

| | | | | |
|---|---|---|---|---|
| 4,233,589 A | * | 11/1980 | Rawson et al. ............... 398/60 |
| 4,491,942 A | * | 1/1985 | Witte et al. .................... 398/99 |
| 4,545,077 A | * | 10/1985 | Drapala et al. ................ 398/60 |
| 4,561,118 A | * | 12/1985 | Thinschmidt et al. ......... 398/60 |
| 4,630,254 A | * | 12/1986 | Tseng .......................... 398/61 |
| 4,701,904 A | * | 10/1987 | Darcie .......................... 398/72 |
| 4,839,886 A | * | 6/1989 | Wu et al. .................... 370/463 |
| 4,850,047 A | * | 7/1989 | Iguchi et al. .................. 398/60 |
| 5,034,944 A | * | 7/1991 | Grimes et al. ................ 398/60 |
| 5,073,982 A | * | 12/1991 | Viola et al. ................... 398/61 |

* cited by examiner

Primary Examiner—Leslie Pascal
Assistant Examiner—Dzung Tran
(74) Attorney, Agent, or Firm—Crowell & Moring LLP

(57) ABSTRACT

A data bus structure for cooperating with a plurality of nodes which are connected to each other. The data bus structure includes optical transmission modules associated with each node and a logical decision gate having inputs associated with each node. The logical decision output signal is provided in parallel to each node through the optical transmission modules. These modules serve to convert optical signals from the nodes to electrical signals and output to the logical decision gate and to convert electrical signals output from the logical decision gate to optical signals and output to the nodes. In order to separate a single node from the data bus, the transmission mode is monitored and an independently controlled switch is positioned between the logical decision gate and the optical transmission module. This arrangement functions to exclude a node from bus communication while leaving the remaining nodes uninterrupted.

4 Claims, 1 Drawing Sheet

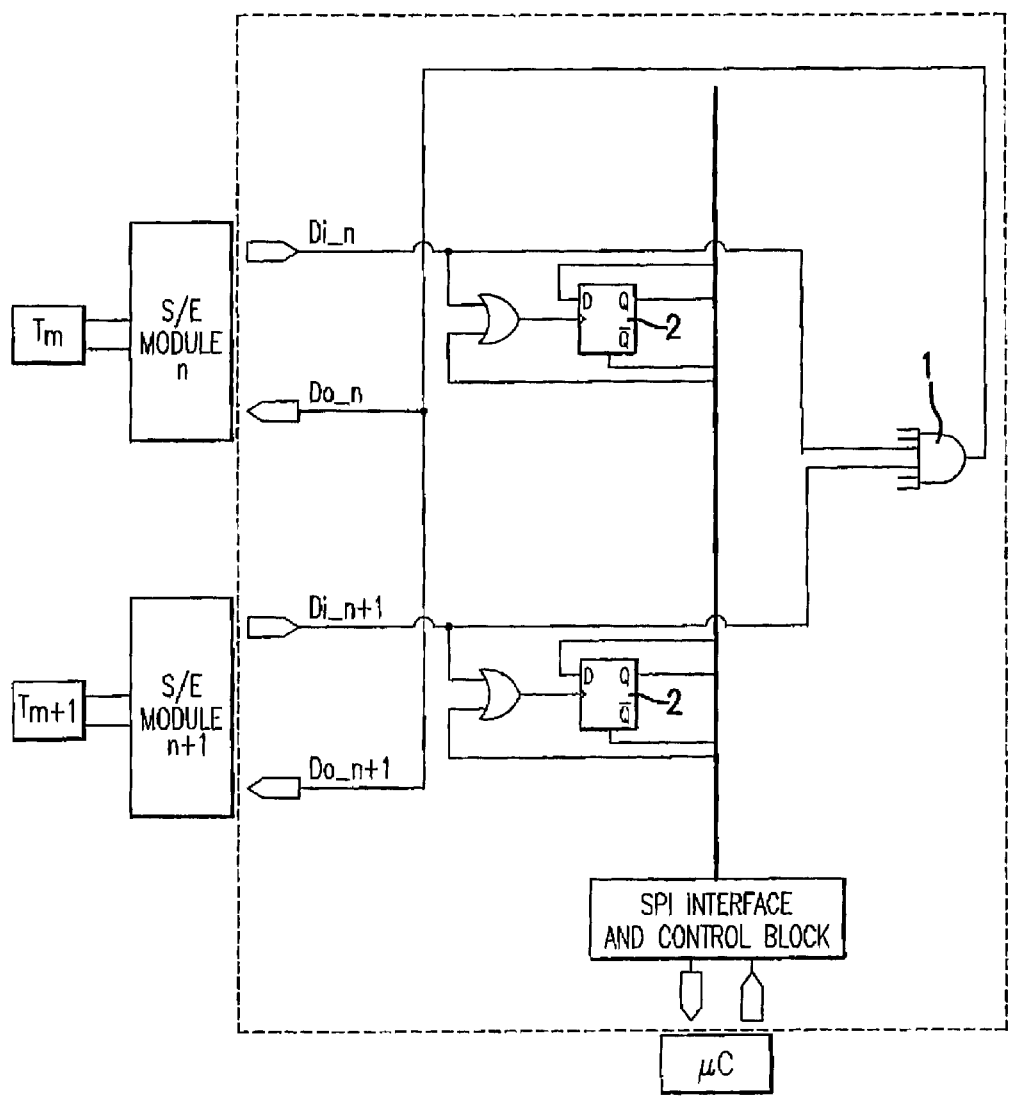

DATA BUS FOR A PLURALITY OF NODES

BACKGROUND AND SUMMARY OF INVENTION

This application claims the priority of German Patent Document 198 10 290.9 filed Mar. 10, 1998 and PCT/EP99/01162 filed Feb. 23, 1999, the disclosures of which is are expressly incorporated by reference herein.

The invention relates to a data bus for a plurality of nodes which are connected to one another via a star coupler. A data bus of this type is known from the German Patent Application 19720401 not previously published. Therein the nodes are connected to the data bus via transmitter/receiver modules. In particular when nodes which issue optical data information are connected to the data bus, a malfunction of the bus node may occur (for example, continuous transmission of information) or there may occur a fault in a transmitter/receiver module (for example, if the output of an opto-electrical transducer used in the transmitter/receiver module remains outside of the signal traffic even at the Low level, which actually occurs only in the case of signal traffic). This malfunction or fault blocks bus communication. In this case the source of the fault cannot be determined automatically and it is also not possible to intervene automatically Therefore, bus communication continues to be disrupted until it is repaired.

The objective of the invention is to provide a data bus which is able to monitor the data traffic on the data bus and in particular to exclude a node from bus communication.

According to the preset invention, a series of individual measures, in combination, are used to obtain the desired effect. On the one hand optical signals case are converted into electrical form and fed as input signals to the star coupler. The star coupler itself contains a logical decision gate to which the input signals are fed and whose output is connected in a parallel manner via an electrical line to the inputs of the nodes. To each input of the decision gate a switch is connected in parallel which can be activated if necessary and which interrupts the transmission segment between the node and the decision gate thereby separating the node from the data bus.

Because the switch is addressed, it is possible in a simple manner to separate only a single node from the data bus.

Other objects, advantages and novel features of the present invention will become apparent from the following detailed description of the invention when considered in conjunction with the accompanying drawings.

BRIEF DESCRIPTION OF THE DRAWINGS

The single FIGURE illustrates the data bus according to the invention is represented in which the transmission mode of the node is monitored.

DETAILED DESCRIPTION OF THE DRAWINGS

Two nodes $T_n$ and $T_{n+1}$ on a data bus D are connected via S/E (transmitter/receiver) modules $S/E_n$ and $S/E_{n+1}$. The modules $S/E_n$ and $S/E_{n+1}$ convert optical information from the nodes $T_n$ and $T_{n+1}$ into electrical form and transmit signals $Di_n$ and $Di_{n+1}$ as input signals to a logical decision gate (AND gate 1) which is the central component of a star coupler K. The number of the input and outputs of the AND gate 1 corresponds to the number of the bus nodes. The output of the AND gate drives all the inputs ($DO_n$, $DO_{n+1}$) of the modules $S/E_n$ and $S/E_{n+1}$. The modules convert the electrical signals into optical signals and transmits via optical transmission segments to the nodes $T_n$ and $T_{n+1}$.

To each bus node input on the star coupler K a switch is assigned which consists of an OR gate 3 and a control register 4. The OR gate 3 is provided in each input path of the AND gate 1. Its second input is connected to the output of the control register 4.

If it is required to exclude a node from bus communication, a microcomputer uC via a serial interface (for example SPI) from the corresponding control register 4 provide the required exclusion. A High level signal is supplied to the corresponding OR gate 3. Thereby a Low level at this input of the star coupler can no longer pass. The connected node can no longer influence bus traffic. If the fault is eliminated, the switch can be closed once again That is, the control register 4 is deactivated and the OR gate 3 again allows passage of a Low level.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data bus arrangement for a plurality of nodes connected to each other, said data bus arrangement comprising:
   a logical decision gate having a plurality of inputs corresponding to said plurality of nodes;
   at least one optical transmission converter connected between said nodes and said logical decision gate wherein each said optical transmission converter receives an optical signal from one of said nodes and provides an electrical signal to one of said inputs of said logic decision gate and wherein an output of the logic decision gate is connected to an input of each of said at least one optical transmission converter;
   a plurality of switching means wherein each of the said switching means is connected between an output of one of said optical transmission converters and one of said inputs of said logical decision gate, each of said switching means including a control device for providing control of said switching means independent of an output of one of said nodes corresponding to said switching means.

2. The data bus arrangement according to claim 1, wherein said switch is addressable.

3. The arrangement according to claim 1, wherein said switch device is addressable.

4. A star coupled data bus configuration for a plurality of nodes connected to each other, said configuration comprising:
   a logical decision gate having a plurality of inputs corresponding to said plurality of nodes;
   at least one opto-electrical transducer for converting optical signals from said nodes into electrical signals output to said inputs of logical decision gate and for converting an output from said logical decision gate into an optical signal provided to said nodes;
   a plurality of switch devices, each of said switch devices being connected between one of said opto-electrical transducers and one of said inputs of said logical decision gate; and
   a control device for controlling each of said switch devices independently of said plurality of nodes.

* * * * *